Patented Aug. 24, 1937

2,090,905

UNITED STATES PATENT OFFICE 2,090,905

POLYMERIZATION OF OLEFINS

Donald R. Stevens, Swissvale, and William A. Gruse, Wilkinsburg, Pa., assignors to Gulf Research & Development Company, Pittsburgh, Pa., a corporation of Delaware No Drawing. Application November 17, 1936, Serial No. 111,335

8 Claims. (Cl. 260—170)

This invention relates to polymerization of olefins and it comprises a method of treating olefinic gases for the production of liquid polymers useful as a motor fuel, which comprises bringing the olefinic gases into contact with a strong acid, such as strong sulfuric acid or benzene sulfonic acid, in the presence of a polyhydric aliphatic alcohol, such as glycerin, ethylene, glycol or the like, the alcohol acting as a modifying or mitigating agent to restrain undesirable non-polymerizing activities of the acid and to regulate and control the extent of polymerization of the olefins and the volatility of the final polymer product; all as more fully hereinafter set forth and as claimed.

Considerable attention has been paid in recent years to the polymerization of olefinic gases for the production of low-boiling liquid polymers useful as motor fuel. Various thermal and catalytic processes have been proposed and used. Of the catalytic processes, one which has attained some success relies upon the use of phosphoric acid as a polymerizing catalyst. Commercial sirupy phosphoric acid (ortho phosphoric acid) can be used to give a fair yield of polymers from olefinic gases and when properly employed, the products obtained are largely useful as motor fuel. However, the process is subject to some disadvantages; phosphoric acid is relatively expensive and at high temperatures the ortho acid tends to go over to dehydrated forms (pyro and meta acids) in an irregular way with irregular results. Sometimes volatile esters are produced.

Sulfuric acid is free from the disadvantages noted and is much cheaper than phosphoric acid, but is a stronger acid and this fact imposes some restriction upon its use. If high-strength acid is used, it tends at elevated temperatures to react with the hydrocarbons undergoing treatment, forming sulfur dioxide and carbonization products. Strong sulfuric acid also tends to have too strong a polymerizing effect, producing polymers which are too high boiling to be used for gasoline motor fuel. It cannot be re-used. On the other hand, dilute sulfuric acid is largely restricted in its polymerization effect to iso-butylene. Thus iso-butylene may be polymerized to the dimer (di-iso-butylene) and the trimer (tri-iso-butylene) by absorption of iso-butylene in 60 to 65 per cent $H_2SO_4$, the acid being subsequently adjusted in acidity and warmed to separate polymerized products, as disclosed in our copending application Serial No. 54,336, filed December 13, 1935, said method comprising a modification of the well known Butlerow method described in the literature as far back as 1877.

Our present invention comprises a process of polymerizing gaseous olefins in which the disadvantages of the strong-acid processes mentioned hereinabove are overcome. According to our invention, the polymerizing agent comprises a mixture of a strong acid, such as sulfuric acid having a strength of from 80 to 100 per cent, benzene sulfonic acid, phenol sulfonic acid, naphthalene sulfonic acid or the like, with certain mitigating agents. The mitigating agents employed are the various polyhydric aliphatic alcohols, such as glycerin, the various glycols, erythritol and mannitol; glycerin is preferred because of its cheapness and availability. The mitigating agent has a marked effect upon the action of the strong acid, not only reducing or eliminating the tendency toward undesirable side reactions, but controlling the extent of polymerization, so that the resultant polymers are more volatile than would otherwise be the case and contain a higher proportion of polymers boiling within a gasoline boiling-point range.

The process is carried out either intermittently or continuously, by subjecting the olefinic gases to contact with the catalyst, at an atmospheric or elevated temperature, and preferably under pressure. At high temperatures, the normally liquid polymers formed may vaporize during the reaction and are recovered from the effluent gases by condensation or the like. At lower temperatures, the polymers remain in the liquid phase and are separated from the catalyst in this phase, as for example by means of gravity.

It is ordinarily advantageous to distribute the mixture of strong acid and mitigating agent upon a suitable carrier having a large surface in proportion to volume, such as pumice, tile, broken stone or the like.

The strength of the acid employed will vary considerably in accordance with the temperature employed and the results desired. Ordinarily we prefer to use 80 to 90 per cent sulfuric acid, but sulfuric acid up to 100 per cent may be employed, especially with relatively dilute olefinic gases.

The temperatures employed will depend to some extent upon the concentration of the acid and the olefinic starting material but should be such as to avoid decomposition of the mitigating agent, for example, the oxidation of glycerin to acrolein or the like. With sulfuric acid, temperatures up to 130° C. are suitable, while with the sulfonic acids temperatures up to about 200° C.

may be employed. Increasing the operating temperature tends, in general, to produce a more volatile product.

The pressures employed in the operation may run up to 500 pounds per square inch when working with gases relatively rich in reactive unsaturates, while in working with gases of relatively low unsaturate content the same or higher pressures, up to say 1000 pounds per square inch, may be employed.

The amount of mitigating agent employed may run as high as 50 per cent by volume of the mixture of mitigating agent and acid, a range of from 25 to 50 per cent giving the best results.

In order to illustrate the effectiveness of our process, two runs, referred to hereinbelow as Run A and Run B, respectively, were made, in which a refinery butane cut was contacted in Run A with 90 per cent sulfuric acid and in Run B with a mixture of 75 parts by volume of 90 per cent sulfuric acid and 25 parts by volume of glycerin. These runs were conducted in an unheated autoclave provided with a stirring mechanism. In the case of Run A the autoclave became very hot during the treatment, while in the case of Run B the autoclave remained within a few degrees of body temperature, although in each case the time of contact was the same. After the reaction had been completed, the autoclave was opened and the products were withdrawn; in Run A the acid had been seriously discolored, being actually dark brown in color and the odor of $SO_2$ was very pronounced. In Run B the mixture of acid and mitigating agent had been only slightly discolored to a light orange color and the odor of $SO_2$ was very faint. These facts indicate that side reactions had occurred to a considerable extent in Run A but not in Run B. As would be expected, a somewhat smaller volume of polymers was recovered in Run B than in Run A, the yields being 58.7 per cent and 73.5 per cent, respectively, based on the total unsaturates in the charge. However, a striking increase in volatility of the polymer obtained in Run B was noted, as will be indicated by the following table of distillation characteristics.

|  | Run A | Run B |
|---|---|---|
| Per cent to 140° C. | 7.5 | 68.5 |
| Per cent 140° to 190° C. | 27.5 | 21.5 |
| Per cent above 190° C. | 65.0 | 10.0 |

In the above runs the refinery gas was a so-called "butane cut" containing 32 per cent isobutylene, 32 per cent 1-butene and 2-butene, 5.7 of propane and propylene and the balance consisting of normal isobutane. Our tests have shown that our process polymerizes not only isobutylene but also 1-butene and 2-butene as well as propylene. Ethylene is less readily polymerized. It will be obvious that the gas employed may consist of the various reactive unsaturates alone, or in admixture with saturated hydrocarbons, although it is ordinarily preferred to work with gases containing a concentration of at least about 20 per cent of unsaturates having three to four carbon atoms per molecule.

In another series of runs, isobutylene was subjected to contact with mixtures of benzene sulfonic acid and glycerin, containing from 25 to 40 per cent by volume of glycerin, at temperatures ranging from 76° to 130° C. and the results were compared with those obtained by treating isobutylene with benzene sulfonic acid alone. In each case a definite increase in the percentage of the polymers boiling below 140° C. was observed, as compared to the use of benzene sulfonic acid alone. For example, in a run employing 25 per cent by volume of glycerin with benzene sulfonic acid at a temperature of 130° C., 48.4 per cent of the polymer boiled up to 140° C., 42.2 per cent between 140° and 200° C. and only 9.4 per cent boiled above 200° C. With the mitigated acid little or no evidence of side reaction was observed, while with benzene sulfonic acid alone there were definite indications that side reactions had occurred to a considerable extent.

It may be mentioned at this point that one of the advantages of the present invention is that, due to the substantial absence of side reactions, the mixture of acid and mitigating agent may be repeatedly employed in batch operation and is capable of being employed over expanded periods in continuous operation.

The fact that the yield of polymers tends to be somewhat less than the yield obtained in similar tests with unmitigated acid is not serious, as the total yield may be increased by longer time of contact, as by repeating the contact in a series of operations; it is possible to obtain a higher yield of low boiling gasoline-like polymers than can be obtained by the use of unmitigated strong acid.

In order to increase the yield of polymers, the gases are passed through a series of reactors containing the mitigated acid, preferably supported upon an inert carrier as described. Recycling of the effluent gas is not ordinarily desirable unless the original gas consists predominantly of polymerizable olefins, for example, isobutylene.

Wherever sulfur is present in the original gas in such form that the polymers would contain sulfur in such form or to such an extent as to be difficult to remove by ordinary refining methods, the gas may be subjected to a simple desulfurization treatment in any well known manner before being brought into contact with the polymerizing catalyst.

It may be observed that at the higher temperatures and when the gases are dry, the acid mixture may tend to lose moisture and become concentrated. In continuous operation, wherever this effect would produce an acid concentration higher than that desired, the effect may readily be overcome by adding sufficient moisture either to the acid or to the gases to balance the dehydrating effect and maintain the acid at the desired concentration.

While our invention has been described in connection with its preferred embodiment, that is to say the straight polymerization of gaseous olefins to liquid polymers useful as motor fuels, the mixture of strong acid and mitigating agent may be employed in other reactions, for example, condensation reactions in which sulfuric acid is contacted with olefins and other materials for the purpose of producing products of higher complexity by polymerization condensation or alkylation, where it is desired to eliminate or reduce the undesirable decomposition reactions which would otherwise result from the use of strong unmitigated acid.

In the polymerization processes described, the resultant polymers are of especial value as motor fuel both by reason of their volatility and by reason of their high anti-knock value, which applies not only to those substances boiling within the ordinary gasoline boiling-point range but also to somewhat higher boiling polymers, which may be used as safety fuel, for example, in internal combustion engines of the so-called "direct injection" type other than Diesel type engines.

It will be apparent to those skilled in the art that whereas our invention has been described hereinabove in connection with specific operating details by way of exemplification, our invention is not in its broadest aspects limited to such details, but may be variously practiced within the scope of the claims hereinafter made.

What we claim is:

1. In a process of forming valuable compounds of higher molecular weight from normally gaseous olefins under the influence of a catalyst selected from the class consisting of strong sulfuric acid and sulfonic acids, the improvement which comprises effecting contact between the olefinic starting material and the strong acid catalyst in the presence of a polyhydric aliphatic alcohol, said alcohol being present in such amount as to restrain non-polymerizing action of the strong acid upon the hydrocarbon.

2. A process as claimed in claim 1 wherein the restraining agent is glycerin.

3. A process as claimed in claim 1 wherein the restraining agent is glycol.

4. The process of making liquid polymers, at least a portion of which boils within a gasoline boiling-point range, from olefins of the class comprising propylene and butylenes, which comprises subjecting such olefinic material to contact with a mixture of sulfuric acid of from 80 to 100 per cent strength and glycerin.

5. A process as claimed in claim 4 in which the mixture of acid and glycerin contains from 25 to 50 per cent by volume of glycerin.

6. A catalyst for the polymerization of olefins comprising a mixture of a strong acid selected from the group consisting of strong sulfuric acid and sulfonic acids, and a polyhydric aliphatic alcohol.

7. A catalyst for the polymerization of olefins comprising a mixture of a strong acid selected from the group consisting of strong sulfuric acid and sulfonic acids, and glycerin.

8. A process of forming valuable compounds of higher molecular weight from normally gaseous olefins which comprises contacting such olefins with a mixture of a phenol sulfonic acid in the presence of a relatively small amount of glycerin.

DONALD R. STEVENS.
WILLIAM A. GRUSE.